Figure 3:
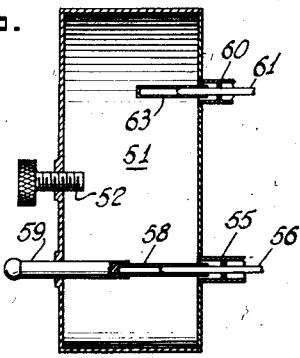

March 18, 1947.　　　P. S. CARTER　　　2,417,542
IMPEDANCE MATCHING CIRCUIT
Filed Feb. 4, 1943　　　3 Sheets-Sheet 1
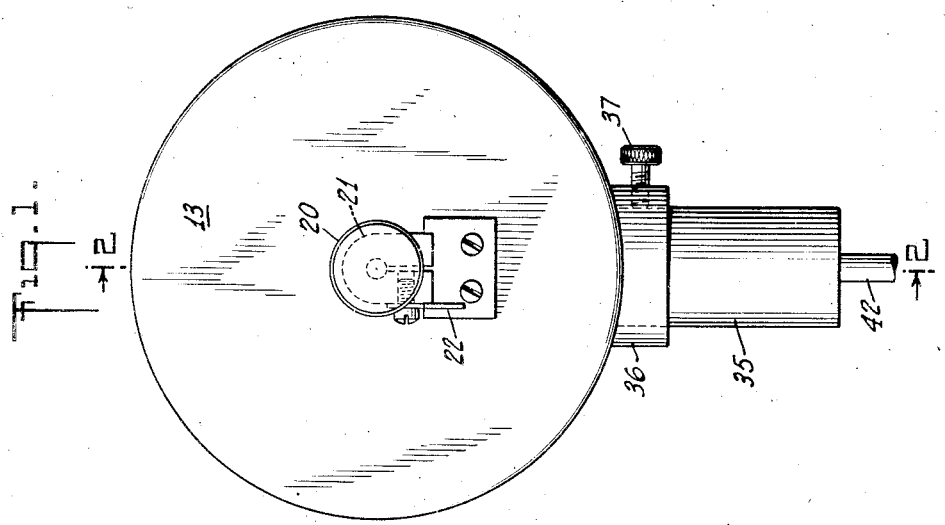
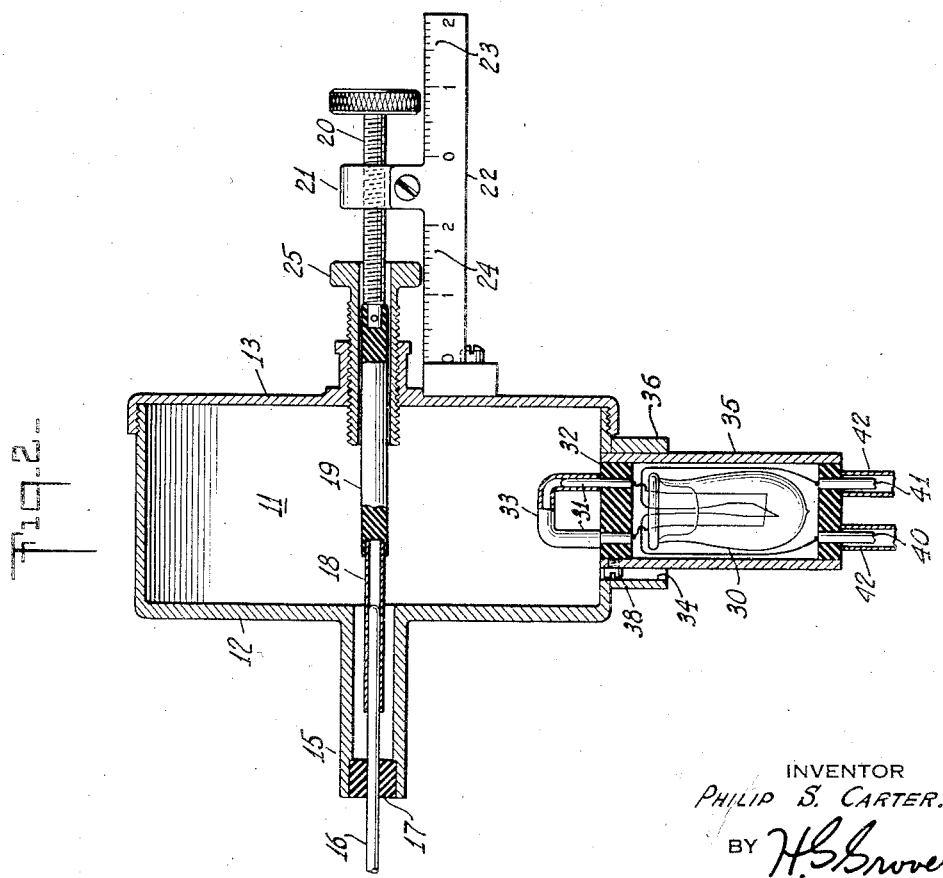
INVENTOR
PHILIP S. CARTER.
BY H. S. Grover
ATTORNEY March 18, 1947.  P. S. CARTER  2,417,542
IMPEDANCE MATCHING CIRCUIT
Filed Feb. 4, 1943  3 Sheets-Sheet 2

INVENTOR
PHILIP S. CARTER.
BY H.C. Grover
ATTORNEY

March 18, 1947. P. S. CARTER 2,417,542
IMPEDANCE MATCHING CIRCUIT
Filed Feb. 4, 1943 3 Sheets-Sheet 3
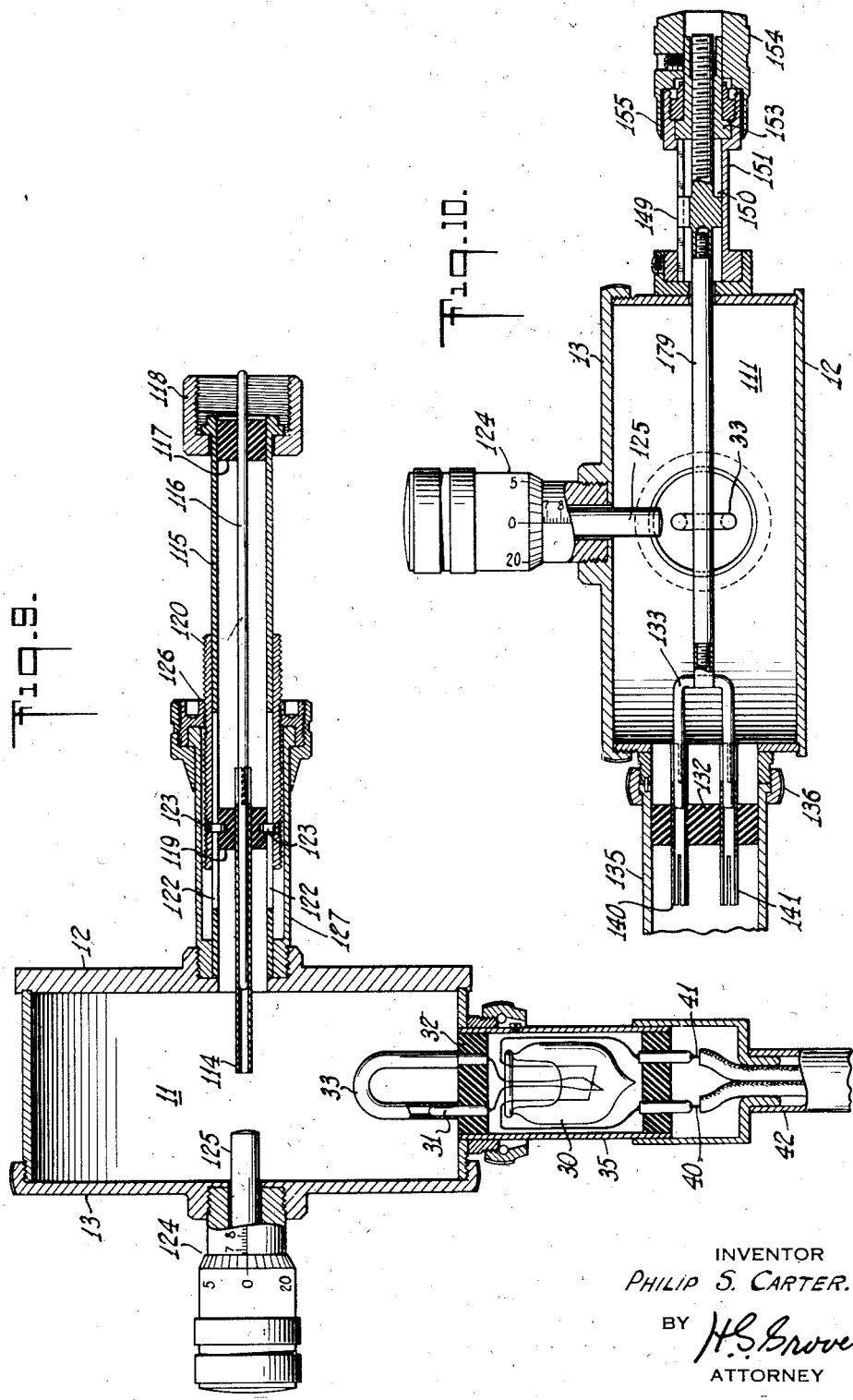
INVENTOR
PHILIP S. CARTER.
BY H.S.Grover
ATTORNEY Patented Mar. 18, 1947

2,417,542

UNITED STATES PATENT OFFICE 2,417,542

IMPEDANCE MATCHING CIRCUIT

Philip S. Carter, Rocky Point, N. Y., assignor to Radio Corporation of America, a corporation of Delaware Application February 4, 1943, Serial No. 474,657

4 Claims. (Cl. 178—44)

The present invention relates to impedance matching circuits and, more particularly, to such circuits utilizing cavity resonators with tuning and coupling adjustments for matching a transmission line or other radio frequency device to a load having an impedance which may be varied over a considerable range.

In the prior art it has been common practice to match a load to a source of energy by means of shunt circuits placed on the transmission line or by serially connected matching circuits. In working with measurements at ultra high frequencies of the order of several thousands of megacycles considerable difficulty has been experienced in matching a receiving antenna to a thermo-couple connected to a transmission line associated therewith. Antennas used in measurements, as mentioned above, are usually connected to the termination of a single coaxial line. In order to properly feed a thermocouple it should be connected to a perfectly balanced two conductor transmission line. When a thermocouple is used with a perfectly balanced two conductor line the heater wires of the thermo-couple are in effect on either side of a neutral point formed at the junction of the direct current leads. Any unbalance in the two conductor transmission line causes the neutral point to deviate from the point of connection of the direct current leads and thereby disturb the operation of the thermocouple. When using the well known pot or trap circuits for changing from a single to a two conductor line and matching the impedance of the two conductor line to the thermo-couple by means of a matching stub line section several difficulties are encountered. The exposed two conductor line radiates or picks up radiation directly. The direct current leads from the thermo-couple to the meter also acts as an antenna feeding into the thermo-couple. The last mentioned effect cannot be eliminated by shielding the direct current leads unless the shield continues as an enclosure for the entire length of the two conductor transmission line, including the matching stubs. However, if the two conductor transmission line is entirely enclosed the difficulties of adjusting the matching circuit become enormous.

An object, therefore, of the present invention is to eliminate the above difficulties.

A further object is to provide an impedance matching circuit which may be quickly and easily adjusted.

A further object of the present invention is to provide a transformer from single coaxial lines to two conductor lines which is inherently perfectly balanced to neutral.

A further object is to provide a quickly and easily adjusted impedance matching circuit.

Still a further object is to provide an impedance matching circuit which is capable of being perfectly shielded throughout.

The foregoing objects, and others which may appear from the following detailed description are attained in accordance with the principles of the present invention by providing a drum-shaped cavity resonator adapted to be tuned over a narrow range of frequencies around the operating frequency to be used. A coaxial line from the antenna, for example, is coupled by an extension to the cavity resonator of the inner conductor of the coaxial line into the resonator. The amount of penetration or retention into the resonator of the central conductor may be varied by calibrated adjusting means so as to vary the coupling by definite and known amounts. The tuning of the cavity resonator may be varied by providing an adjustable internal projection from one surface, the projection having its maximum effect if placed at the center of one of the flat surfaces of the cavity resonator. Finally, an inherently balanced two conductor line is coupled to the cavity resonator by means of an adjustable size loop projecting into the resonator in such position that it links with the magnetic lines of force within the resonator.

When the impedance matching circuit as so far described is used in conjunction with a thermo-couple an entirely shielded extension may be provided at one side of the cavity resonator. The thermo-couple is placed within the extension and the alternating current terminal connected to the coupling loop. A shielded two conductor line may then be provided between the direct current terminals of the thermo-couple and a direct current meter. Thus an expression of the power input to the cavity resonator may be obtained.

Figure 4:
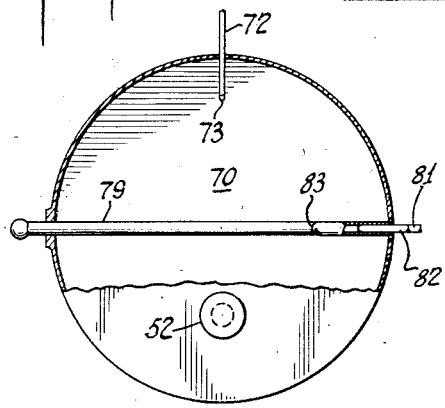
Figure 5:
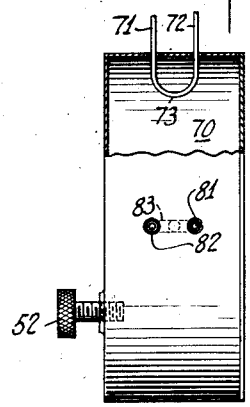
Figure 6:
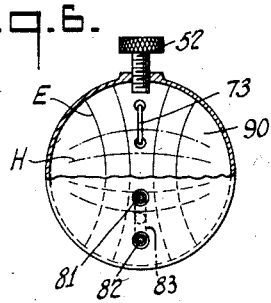
Figure 7:
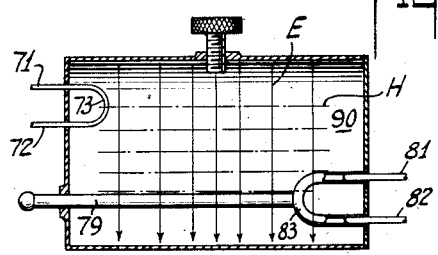
Figure 8:
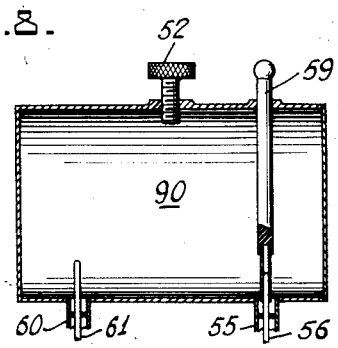

The novel features which, it is believed, are characteristic of the present invention are pointed out with particularity in the appended claims. The invention will, however, be more completely understood by reference to the following detailed description which is accompanied by a drawing in which Figure 1 is an end view of an embodiment of the present invention, while Figure 2 is a section of the embodiment of Figure 1 taken along line 2,2; Figure 3 illustrates in section a modification of the invention while Figures 4 and 5 illustrate in transverse section and partial lateral section a further embodiment of the invention for coupling a pair of two conductor lines together; Figures 6, 7 and 8 illustrate an application of the invention to a resonator operating in a different mode than the previous modifications and Figures 9 and 10 are mechanical variations of the invention.

The cavity resonator illustrated in Figures 1 and 2 includes a hollow drum-shaped enclosure 11 having one end wall 12 permanently attached thereto. The other end wall 13 is preferably arranged to be removable from the resonator to provide access to the interior of the resonator. Through wall 12, preferably at its midpoint, extends a coaxial transmission line having an outer shell 15 connected to end wall 12 and an inner conductor 16 maintained in coaxial relationship with shell 15 by means of suitably arranged spacers 17 of dielectric material. Surrounding the end of central conductor 16 is a conductive sleeve 18 arranged for sliding movement longitudinally along conductor 16. This may be accomplished by means of an insulating rod 19 attached to the end of sleeve 18 and passing through wall 13 of the resonator where it is attached to an adjusting screw 20. The adjusting screw 20 is arranged in threaded engagement with a fixed nut 21 attached to bracket 22. Calibrations 23 are engraved on the bracket for the purpose of recording the position of screw 20 and thus the amount of extension of sleeve 18 into resonator 11. Coaxially arranged with respect to screw 20 is a threaded sleeve 25, the head of which cooperates with scale 24 for determining accurately the projection of the threaded sleeve 25 within the cavity resonator 11. The cavity resonator 11 is designed to resonate at the lowest order transverse magnetic mode in which the lines of electric force are all parallel to the axis and in which the lines of magnetic force all form coaxial circuits in planes perpendicular to the axis. The principles involved in this type of resonator are now well known and will not be further discussed here. However, if further information as to this is desired, reference may be had to the following previously filed applications of mine: Ser. #373,955, filed Jan. 10, 1941 (Patent 2,337,184, Dec. 21, 1943); Ser. #373,072, filed Jan. 4, 1941 (Patent 2,357,314, Sept. 5, 1944); Ser. #359,187, filed Oct. 1, 1940 (Patent 2,357,313, Sept. 5, 1944); Ser. #462,251, filed Oct. 16, 1942.

The natural frequency of resonator 11 is entirely independent of its coaxial dimension when the two ends 12 and 13 of the cylinder are flat surfaces. However, I have discovered that the natural wavelength may be increased by adding a projection from one surface, this projection having its maximum effect if placed at the center of the flat surface.

In the particular embodiments shown in Figures 1 and 2 the threaded sleeve 25 projecting within the resonator 11 acts as the tuning adjustment. If the radius of resonator 11 is made about 7% less than the theoretical figure of 0.383 wavelengths corresponding to the first root of the zero order Bessel function, the additional capacity required for resonance is provided by the inner projection of sleeve 25.

Since the lines of electric force are all parallel to the axis of resonator 11 the resonator may be readily excited by the variable length projection of sleeve 18 projecting axially into the cavity of the resonator. By means of the adjusting screw 20 the exposure may be arranged to be adjustable from about zero to nearly one quarter wavelength. The balanced two conductor connection for thermo-couple 30 is provided by means of pins 31 carried by insulating block 32 set in one side of the resonator 11. The pins 31 carry a loop 33 linking the magnetic lines of force within the resonator 11 which, as before pointed out, form coaxial circles in planes perpendicular to the axis. The thermo-couple 30 is mounted within a conductive shielding cylinder 35 sliding into mounting flange 36 and locked into position by set screw 37. A cooperating key and slot arrangement 38, 34 is provided in flange 36 and on cylinder 35 so as to assure that the plane of coupling loop 33 is always parallel to the axis of the cavity resonator. By loosening screw 37 cylinder 35 may be withdrawn from the flange 36. Access to coupling loop 33 is thus provided for replacing it with another of different size for varying the coupling between the resonator and the thermocouple.

The direct current output leads from thermocouple 30 are terminated in leads 40, 41 which may be separately shielded by conductive sleeves 42 or they may both be enclosed within a single shielding sleeve. A direct current meter may be connected to leads 40, 41 for obtaining a measure of the power in resonator 11.

It will now be apparent that I have provided an impedance matching circuit for matching from the single coaxial line 15, 16 to the two conductor input to thermo-couple 30 entirely enclosed in metal from the beginning of the coaxial line 15, 16 to the output leads 40, 41. A very large range of impedance ratios may be matched by providing the proper size of coupling loop 33 and by adjusting the excitation of sleeve 18 within the resonator 11. The impedance ratio between the input and output is controlled by the ratio of the length of the exposure of sleeve 18 to the size of the projecting loop 33. Both the size of the loop and the length of the exposure effect the tuning to some extent so that as these are changed the adjustment of threaded sleeve 25 must be changed. If the impedance on the coaxial line side of the resonator is very high it may be found necessary to decrease the size of loop 33 to obtain an impedance match. It has been found in practice that it is advantageous to have at least three different sizes of loop 33 to cover the wide range of conditions encountered in the use of the system.

Although the particular arrangement shown in Figures 1 and 2 was primarily designed for the purpose of matching an antenna to the thermocouple 30, it is obvious that loop 33 may be coupled to a conventional two wire transmission line for conducting the radio frequency energy to any desired type of load. Furthermore, the principles of the present invention may be used for power impedance matching between lines where both the input and output circuits employ coaxial lines.

This is shown in Figure 3 wherein 51 is a cavity resonator similar to that shown in Figures 1 and 2 having a tuning adjustment comprised of adjusting screw 52 projecting through one end wall of the cavity 51 and operating the same way as threaded adjusting sleeve 25 of Figure 2. The input coaxial line 55, 56 carries on the inner conductor 56 an adjustable sleeve 58 similar to sleeve 18 of Figure 2 and the exposure of this sleeve within the casing of resonator 51 may be adjusted by the insulating adjusting rod 59 in the same way as in Figures 1 and 2. In Figure 3 no screw threaded adjustment has been shown for varying the exposure of sleeve 58, nor has any scale been shown in association with screw 52. Obviously, of course, an arrangement similar to that shown in Figures 1 and 2 may be used or a micrometer sleeve arrangement, such as will be described hereafter with reference to Figures 9 and 10, may be used for both adjustments if finer readings are desired. The output line 60, 61 is, in this modification, also a coaxial line. The exposure of the inner conductor within cavity 51 may be adjusted by similar means to that shown for lines 55, 56 or, as shown, fixed length conductive sleeves 63 extending into the cavity 51 and interchangeable in the same way as loop 33 of Figure 2 may be used.

Figures 4 and 5 show still a further modification of the present invention where both the input and output lines are balanced two conductor transmission lines. The transmission line 71, 72 terminates in a fixed length loop 73 within the resonator casing 70 while the adjustable loop 83 associated with two conductor transmission line 81, 82 is adjusted by means of insulating rod 79. The relative placement of the two transmission lines in Figures 4 and 5 is the same as that of the thermo-couple loop 33 of Figure 2.

Figures 6 and 7 show in transverse and longitudinal section a further modification of the present invention wherein the resonator 90 is designed to oscillate at the lowest frequency corresponding to the transverse electric mode wherein the electric field lines are arcuate and lie in a plane transverse to the axis of the resonator. The proper dimensions for this type of oscillation are shown in previous patent applications of mine referred to above; for example, see particularly application #462,251, filed October 16, 1942. This type of oscillation requires a much longer resonator axially than those of the circuits previously discussed but it may be made much smaller in diameter. The input and output lines in this modification are both two conductor transmission lines similar to those shown in Figures 4 and 5 and bearing the same reference numerals. As in Figures 4 and 5, the loop 73 connected to transmission line 71, 72 has a fixed exposure, while loop 83 is slidable by means of insulating rod 79 for adjusting this coupling. If a variable exposure of loop 73 is required it may be accomplished by the same means as for loop 83, or interchangeable loops such as 33 (Figure 1) may be used. The tuning of resonator 90 is, as before, accomplished by adjusting screw 52. In this modification, however, it enters the resonator radially rather than axially.

Figure 8 illustrates in longitudinal section a further modification of the form of the invention shown in Figures 6 and 7 wherein coaxial transmission lines are used for coupling into the resonator 90. Except for the fact that the input transmission line 60, 61 and the output transmission line 55, 56 enter the side of resonator 90 instead of the end wall as in the case of Figure 3 in order to properly couple with the transverse electric field, the operation and adjustment of the exposures of these lines is the same as in Figure 3.

Figure 9 illustrates a further modification of the form of the invention shown in Figures 1 and 2 wherein the adjusting means for the tuning of the cavity and the coupling of the concentric line to the cavity are separated for more convenience in adjustment. The details of construction of the cavity resonator 11, the coupling loop 33 and the thermo-couple 30 with its enclosure 35 are the same as in the case of Figures 1 and 2 and will not, therefore, be further described. Where the same elements appear in both figures without modification the same reference numerals have been used. The cavity 11 in the modification of Figure 9 is tuned to the desired operating frequency by means of a conductive projection 125 extending through the end wall 13 of the resonator. The extent of the projection of conductor 125 into the cavity is adjusted by means of micrometer head 124. The construction of micrometer head 124 is entirely conventional and will not, therefore, be more fully described here. It is possible by means of the micrometer head to very accurately adjust and record the projection of conductor 125 into the cavity resonator.

In this figure the coupling probe 114 projecting into the chamber 11 is tubular in form and slides over a liner conductor 116 which is surrounded by outer shell 115. A coaxial transmission line may be joined to conductors 115, 116 by means of coupling nut 118 engaging a threaded portion of the outer shell of the transmission line. The inner conductor of the line is maintained in engagement with conductor 116 by the longitudinal pressure exerted by coupling nut 118. Inner conductor 116 is maintained in coaxial alignment with shell 115 by fixed insulator 117 and insulator 119 which is attached near the end of tubular probe 114. Through slots 122 in shell 115 pass pins 123 by means of which threaded sleeve 120 is so coupled to insulator 119 and probe 114 that they may all be moved axially with respect to conductor 116 but not rotate therearound. An outer sleeve 127 fastened at one end to end wall 12 of resonator 11 carries at its free end a nut 126 threadedly engaged with sleeve 120. Nut 126 rotates but does not move axially of sleeve 124. Preferably, sleeve 120 is threaded forty threads per inch so that a standard micrometer scale may be placed on shell 115 to be covered and uncovered by the end of sleeve 120. The nut 126 is at one edge divided into twenty-five divisions to act as the thimble of a micrometer.

In Figure 10 is illustrated a further modification of the form of the invention shown in Figure 4, except that the means for adjusting the tuning and coupling are changed in order to assure more accurate adjustment. The tuning adjustment, that is, the penetration of conductor member 125 within the cavity 111 is, as in the case of Figure 9, adjusted by micrometer head 124. The two conductor line is connected to connectors 140 and 141 supported in position by insulating block 132 which may be made of polystyrene or other high quality dielectric material. In order to provide shielding for the two conductor line the line is surrounded by a conducting shell 135. The conducting shell is connected to the casing of resonator 111 by suitable means such as the threaded ring 136. The two conductor line is terminated within the cavity resonator by a coupling loop 133 which is arranged to telescope into and out of the hollow connectors 140 and 141 as it is moved from one side to the other by means of the insulating coupling rod 179. At the side of the resonant chamber opposite the coupling loop 133 rod 179 passes through an aperture in the wall and is connected to a threaded screw 150 which is so arranged within member 151 that it may slide freely to and fro but not rotate. The screw is preferably threaded forty threads per inch in order that standard micrometer calibrations may be placed on member 151 at 149. The screw passes through a threaded nut 153 arranged for rotation only with respect to 151 at the outer end thereof. It is arranged to be rotated by a knurled head 154 bearing on one edge at 155 a twenty-five division scale. As the knurled head 154 is rotated the screw 150 is drawn along its support member 151 pulling the insulating rod 179 with it and thus varying the projection of loop 133 within the casing 111. The coupling loop 33 connected to the thermo-couple is here shown in an end view and since its operation and construction are the same as in Figures 1, 2 and 9 they will not be further described here.

While I have illustrated a particular embodiment of the present invention, it should be clearly understood that it is not limited thereto since many modifications may be made in the several elements employed and in their arrangement and it is, therefore, contemplated by the appended claims to cover any such modifications as fall within the spirit and scope of the invention.

I claim:

1. A coupling means for a pair of transmission lines including a hollow cylindrical resonant chamber, means for varying an electrically effective transverse dimension of said chamber whereby the resonant frequency thereof is varied, the first of said transmission lines having one conductor connected to a wall of said chamber and the other penetrating into said chamber, the penetration of said other conductor being variable, the other of said transmission lines being connected to a conductive loop extending within said chamber.

2. A coupling means for a pair of transmission lines including a hollow cylindrical resonant chamber, means for varying an electrically effective transverse dimension of said chamber whereby the resonant frequency thereof is varied, the first of said transmission lines having one conductor connected to a wall of said chamber and the other penetrating into said chamber, the penetration of said other conductor being variable, the other of said transmission lines being connected to a conductive loop extending within said chamber, the plane of said conductive loop being parallel to the plane in which said other conductor lies.

3. A resonant chamber having a pair of opposing parallel walls, means for varying the resonant frequency of said chamber including a screw penetrating one of said parallel walls, a coaxial transmission line having an outer shell and an inner conductor penetrating one of said parallel walls, means for varying the penetration of said inner conductor into said chamber, said means including an insulating rod connected to the end of said inner conductor and passing through the opposing wall and a conductive loop lying in a plane parallel to the plane of said inner conductor and extending inwardly from the side of said chamber and means for coupling a two conductor transmission line to said loop.

4. A resonant chamber having a pair of opposing parallel walls, means for varying the resonant frequency of said chamber including a screw penetrating one of said parallel walls, a coaxial transmission line having an outer shell and an inner conductor penetrating one of said parallel walls, means for varying the penetration of said inner conductor into said chamber, a conductive loop lying in a plane parallel to the plane of said inner conductor and extending inwardly from the side of said chamber and means for coupling a two conductor transmission line to said loop, a thermo-couple within a shield connected to said chamber and having a pair of terminals connected to said loop, a pair of direct current utilization leads connected to another pair of terminals of said thermo-couple and a shield for said direct current utilization leads.

PHILIP S. CARTER.

REFERENCES CITED

The following references are of record in the file of this patent:

UNITED STATES PATENTS

| Number | Name | Date |
| --- | --- | --- |
| 2,106,713 | Bowen | Feb. 1, 1938 |
| 2,281,550 | Barrow | May 5, 1942 |
| 2,296,678 | Linder | Sept. 22, 1942 |
| 2,103,515 | Conklin et al. | Dec. 28, 1937 |
| 2,250,096 | Engbert | July 22, 1941 |
| 2,142,630 | Conklin | Jan. 3, 1939 |
| 2,311,520 | Clifford | Feb. 16, 1943 |

FOREIGN PATENTS

| Number | Country | Date |
| --- | --- | --- |
| 116,110 | Australian | Nov. 4, 1942 |